June 18, 1963  R. G. MILLHISER ET AL  3,094,207
POWER WASHER AND THE LIKE
Filed May 24, 1961  7 Sheets-Sheet 1

INVENTORS:
ROBERT G. MILLHISER
PETER KOSAR
BY
Curtis, Morris & Safford
ATTORNEYS

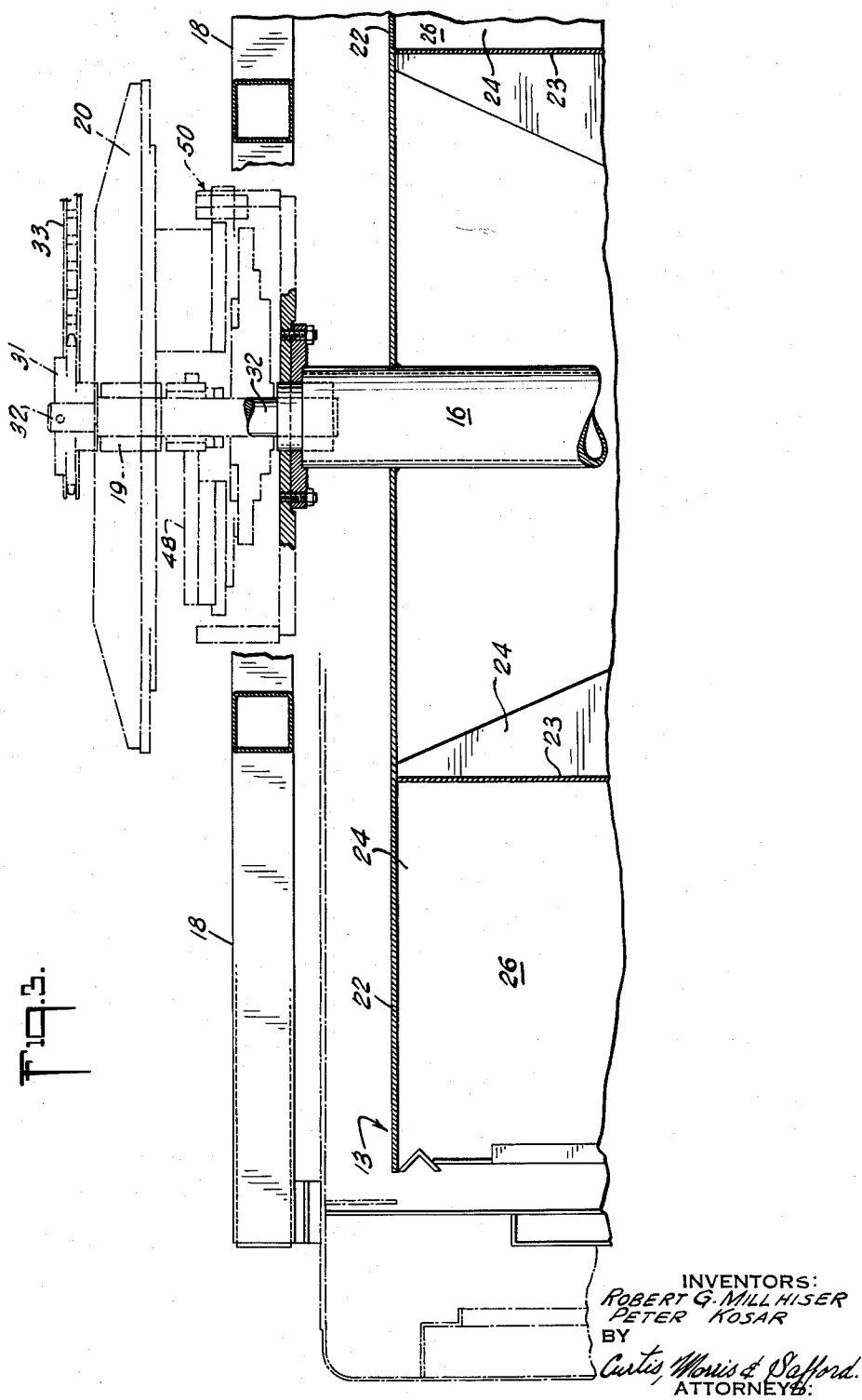

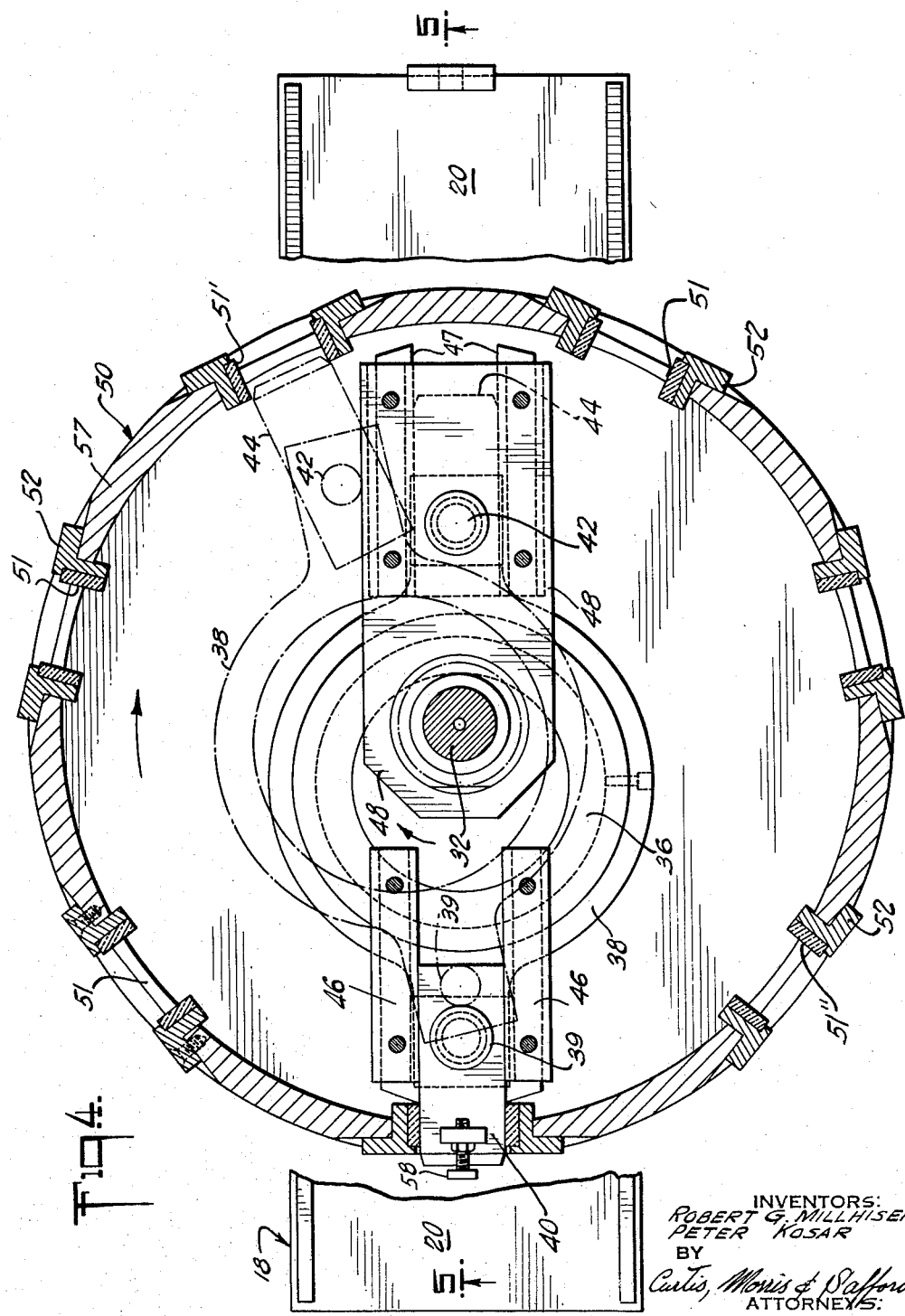

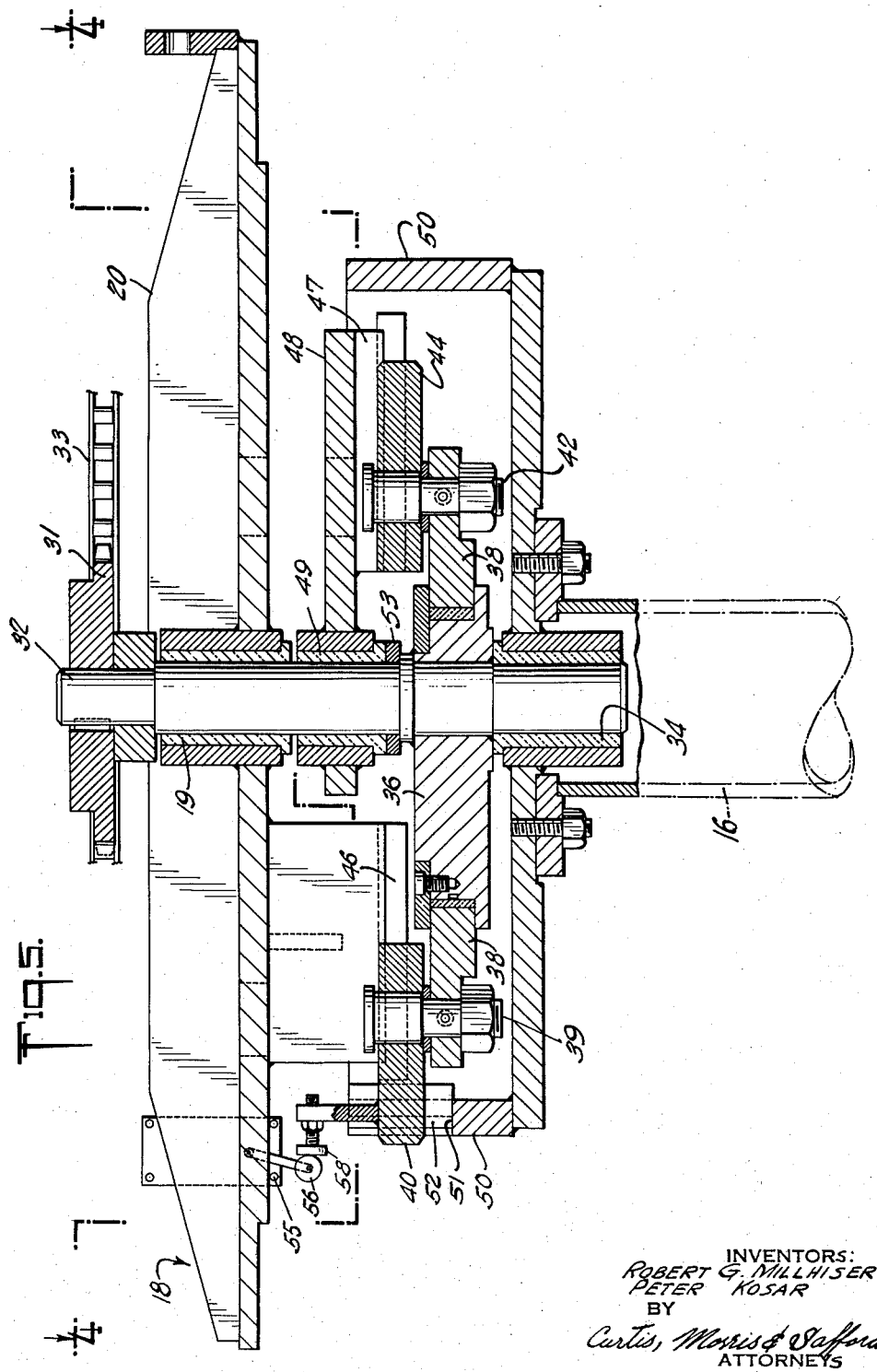

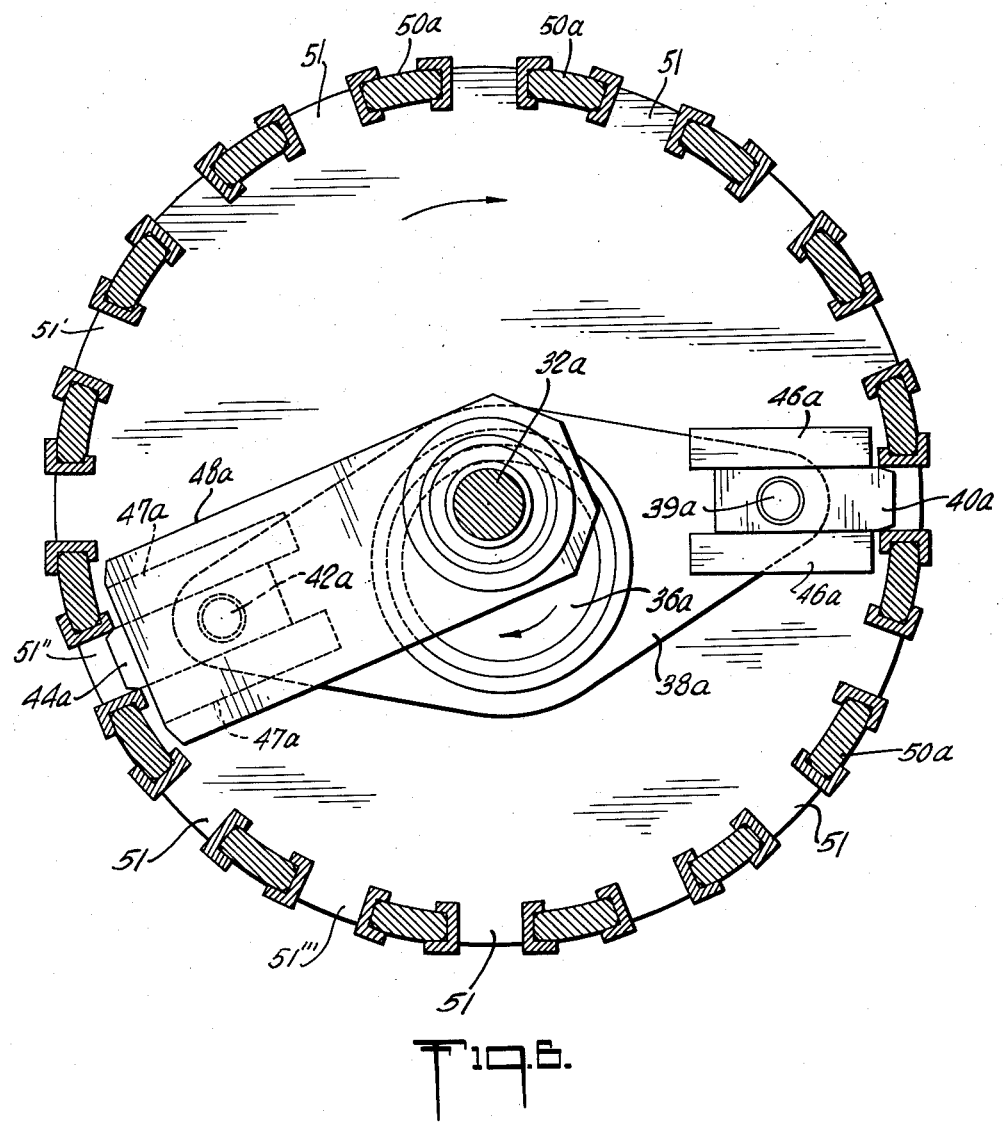

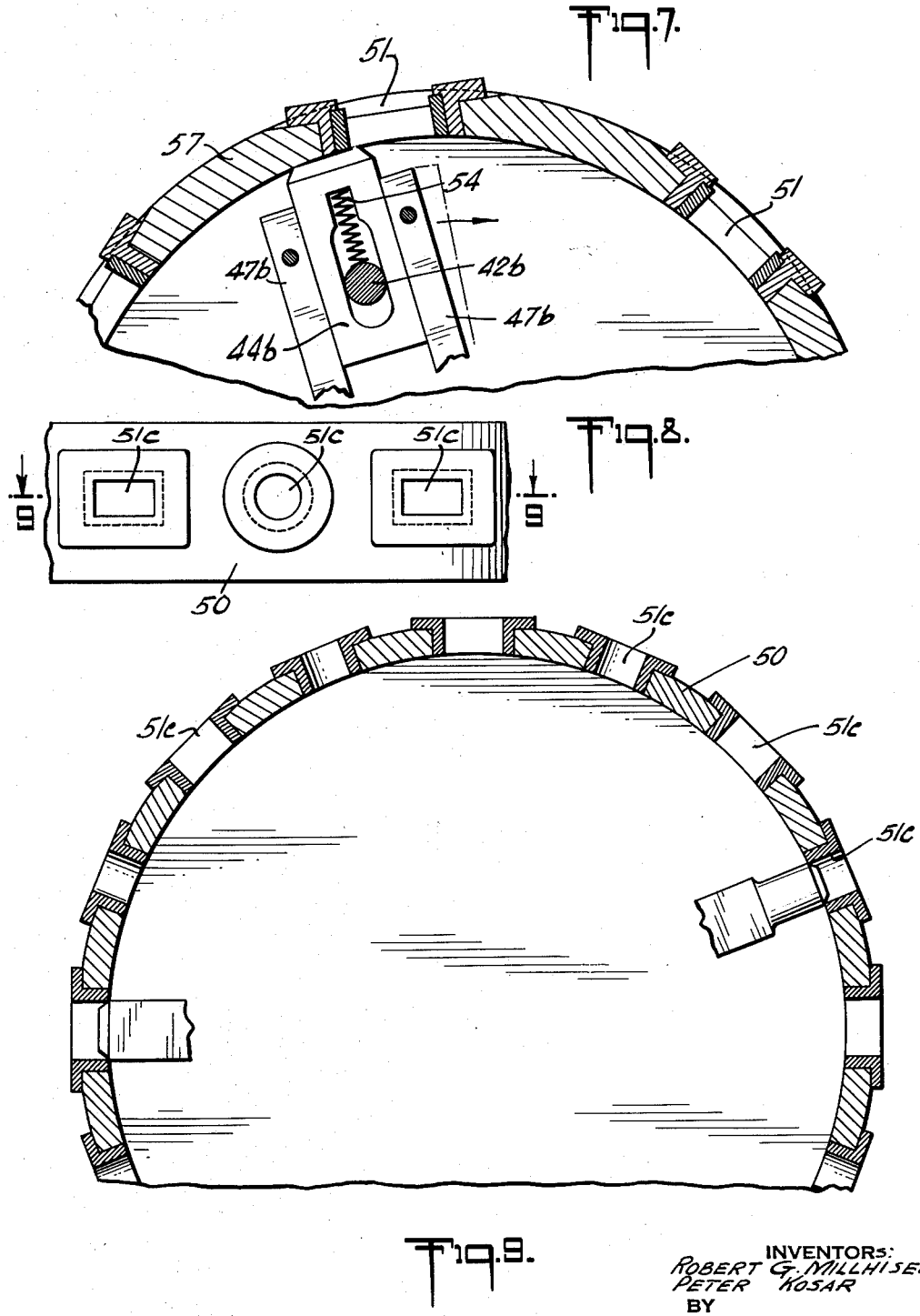

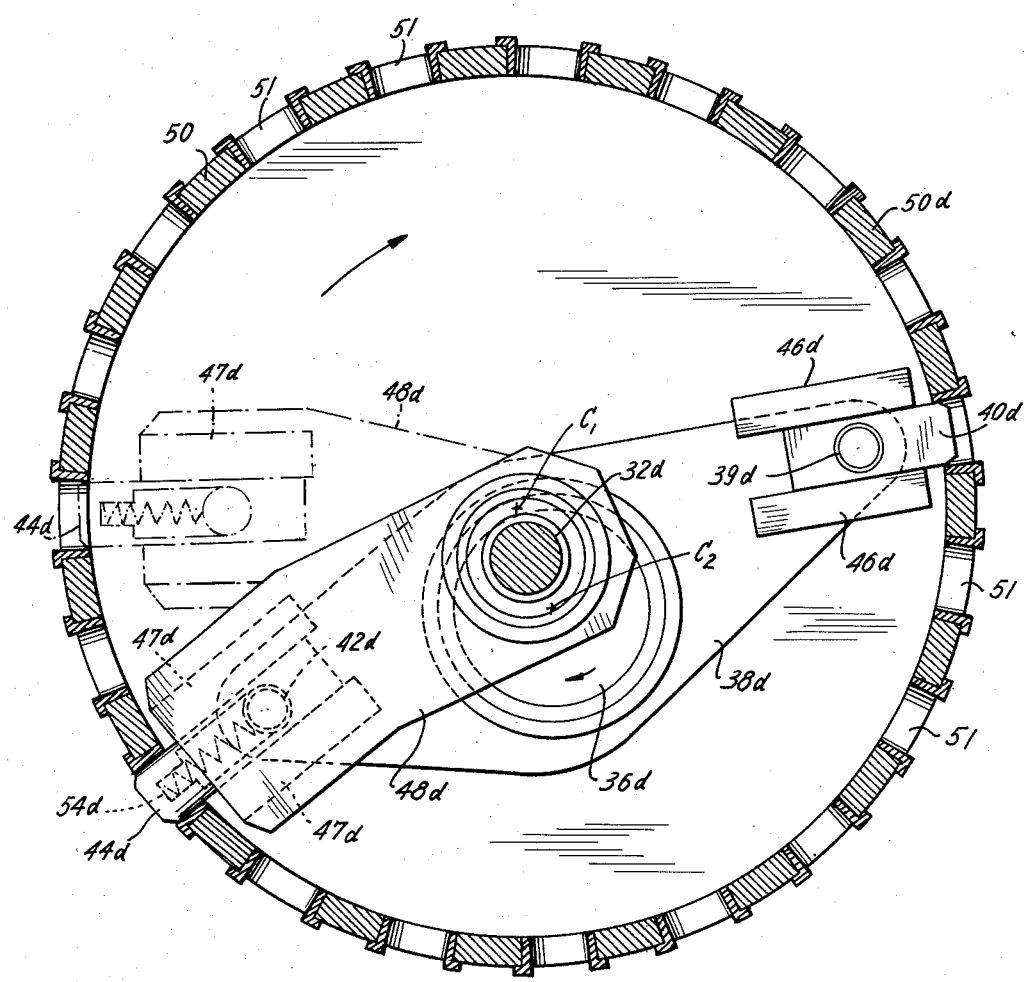

United States Patent Office 3,094,207
Patented June 18, 1963

3,094,207
POWER WASHER AND THE LIKE
Robert G. Millhiser, Detroit, and Peter Kosar, Garden City, Mich., assignors to Ajem Laboratories, Inc., Livonia, Mich.
Filed May 24, 1961, Ser. No. 112,338
17 Claims. (Cl. 198—209)

This invention relates to devices for transporting articles intermittently and in succession, each through a succession of treating stations.

In power washers for treating various production parts, such as castings, stampings, forgings, extrusions, etc., and more especially in apparatus for treating production parts by liquid cleaning, shot blasting, abrasive scouring and/or deburring, e.g., and like apparatus designed for progressive treatment in a succession of steps, there is the problem of effecting progressive movement to and through the various points of treatment, and often it is required to effect such movement step-by-step, with the production part being turned or otherwise perambulated at one or more positions and/or subjected to a period of treatment before being moved on to the next.

With improved industrial technology in other respects, the long-standing need for more perfect cleaning and dressing of parts has led to various attempts to improve methods and apparatus, but the need still remains for apparatus which will reduce costs of manual inspection and manual re-cleaning and increase automation.

In a prior patent of our colleague, Dewey M. Evans, No. 2,832,461 is shown a highly effective equipment of a turret type, into which parts are fed to a rotary carrier, and both the carrier and the individual parts holders mounted thereon are rotated to present the production parts, and the various parts of their surfaces, in changing orientation to high velocity jets or sprays of washing liquid or liquid for other treatment of the production parts and ordinarily to jets of air or other appropriate gas for blowing off residual liquid and drying the parts. In the structure of this Evans patent, the parts are rotated with respect to the rotating carrier by means of suitable gearing, and the rotation of the carrier is described therein as being effected by such, for example, as is disclosed in the patents of our associates, Emil Umbricht and Dewey Evans Nos. 2,918,071; 2,926,674; and 2,979,062.

The indexing mechanism and the accompanying accessories, for abrasive deburring, for example, is complex. In abrasive deburring the position of the parts being treated and the direction of the jets is limited by need to avoid abrasion of the operating equipment and the need to keep the abrasive in suspension. Hence, such equipment has had motors, or planetary drives, on the rotating turret to move the parts relative to the jets. The use of hydraulic motor devices for effecting such movement of the parts requires separate motors for various components of the motion and expensive pumps, valves, piping and other equipment.

We have now demonstrated that it is often more effective and desirable to use a simple electric motor drive to provide a positive step-by-step indexing instead of hydraulic systems.

By the present invention we have provided efficient rotating drive with an eccentric cam mechanism, which is well adapted for such indexing and other step-by-step operations. Our invention results in a very versatile transfer or "indexing" device, which is very economical to construct and maintain. Advantageously, for step-by-step positioning of the production parts for liquid treatment, a smooth acceleration and deceleration of the rotary mechanism is provided.

In the accompanying drawings we have shown a preferred embodiment of our invention; and although we shall point out herein certain modifications and alternatives, it should be understood that these are given for purposes of illustration, in order that others skilled in this art may fully understand the invention and be enabled to modify and adapt it as may be best suited for conditions of various practical uses.

In the drawings:

FIGURE 3 is a fragmentary vertical section taken on line 3—3 of FIGURE 1;

FIGURE 4 is a detail sectional view on an enlarged scale, of a portion of the indexing drive, taken on line 4—4 of FIGURE 5;

FIGURE 5 is a view in vertical section taken on line 5—5 of FIGURE 4;

FIGURE 6 is a detail sectional view similar to FIGURE 4 but of another embodiment of the indexing mechanism embodying the present invention;

FIGURE 7 is a fragmentary sectional view detail of a modified stepping wheel and lock bolt;

FIGURE 8 is a fragmentary view in elevation of a modified stepping wheel.

FIGURE 9 is a fragmentary view partly in plan and partly in section on line 9—9 of FIGURE 8; and FIGURE 10 is a fragmentary view of a further modified indexing drive mechanism.

Figure 1:
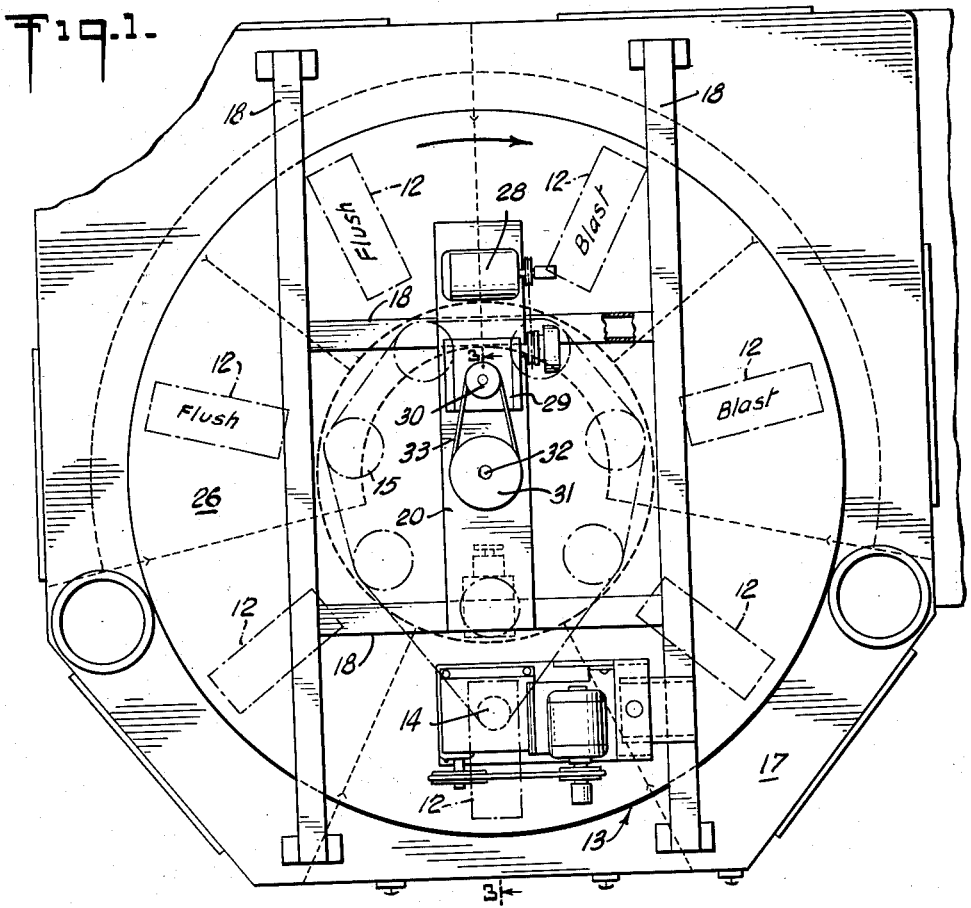
FIGURE 1 is a plan view of a preferred embodiment of our invention.
Figure 2:
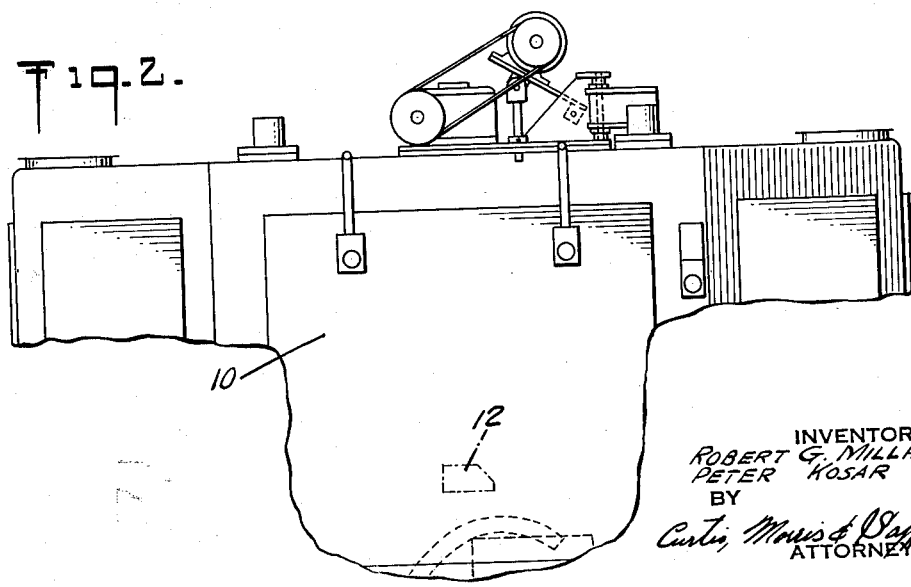
FIGURE 2 is a view of the same in side elevation partly broken away.

Referring first to FIGURES 1 and 2, there is shown an apparatus designed for moving manufactured parts 12 step-by-step through successive treating stations. For purposes of illustration, this is shown as a power washer in the form of a hydraulic abrasive deburring machine for treating automobile engine head castings. The upper part only of the machine with its indexing mechanism is shown in these figures. For simplicity and clarity in explaining the present invention, we have shown the machine arranged for manual loading and unloading of the manufactured parts to be treated, but automatic mechanical feed and discharge of the parts from and to a conveyor or conveyors is both feasible and advantageous.

The parts 12 are inserted through door 10 onto a rotor 13 which is provided with a platform or rotating fixture (not shown) for positioning the parts during their traverse through the machine. Such fixture and its drive connections (diagrammatically shown here at 14, 15) is described and claimed in a copending application of Robert G. Millhiser, Nicholas J. Panzica, Emil Umbricht and Dewey Evans (Attorney's Docket No. 123281), which is rotatably mounted in the machine 17 on a frame 18. The fixture is mounted at its bottom by a bearing (not shown) and at the top by a bearing 19 (FIGURE 3) in a cross bar 20 mounted on the frame 18. An annular disc 22 at the top, a similar disc at the bottom, a cylindrical vertical wall member 23 coaxial with a central column shaft 16, radial partitions and braces 24 and connecting structure are welded together to constitute the rotor and form therein a series of parts-treating chambers 26.

The rotor with its parts-carrying chambers 26 is indexed around step-by-step from station-to-station by an electric motor 28 connected through a speed reducer 29 and a sprocket drive 30, 31 and chain 33 to the indexing drive mechanism best shown in FIGURES 3-6.

Referring to FIGURE 5, the sprocket 31 is on the end of a stub shaft 32 coaxial with the main rotor column shaft 16 and rotatably mounted near the upper end of the rotor column shaft 16 therein by means of a bearing 34. An eccentric 36 keyed or welded on the shaft 32 serves as the cam in this example and rotates within a cam follower 38. At one end of the cam follower 38 is a stud pin bearing 39 engaging a movably lock bolt 40, which is moved inwardly and outwardly by the movement of the stud pin bearing 39, and at the other end of this cam follower 38 is a stud pin bearing 42 engaging a drive bolt 44, which is moved by the movement of the stud pin bearing 42.

A pair of spaced parallel guide rails 46 (see also FIGURE 4) secured on the cross bar 20 slidably engage the bolt 40 confining it in its path for inward and outward movement, which is here shown as a radial path. Another pair of spaced parallel guide rails 47 on a swingable arm 48 guide the drive bolt 44 for inward and outward movement along a path along the arm 48, which is here shown as being in a radial direction with respect to the shaft 32. The guide arm 48 is swingably mounted by a sleeve bearing 49 resting on a washer 53 on top of the cam 36 on the shaft 32; thus, the drive bolt 44 moves inwardly and outwardly and also swings back and forth as driven by the stud pin bearing 42.

By virtue of this structure, as the eccentric 36 rotates, it produces a swinging lateral movement of the follower 38, which at its left end (as seen in FIGURES 4 and 5) is confined by the stud 39 and the bolt 40 to an inward and outward movement. Being thus confined at the left end, the rest of the follower is forced to swing about stud 39 as a fulcrum, thereby swinging the arm 48 as well as moving the drive bolt 44 radially in and out along the guide rails 47.

Surrounding the eccentric and bolt structure just described and secured to rotor 13 is a stepping wheel 50 shown, for example, as a cup 50 with openings 51 into which the respective bolts 40 and 44 slide to engage the cup 50, and through it to control the indexing movement of the rotor 13. In operation, the bolt 40 locks the stepping wheel 50 against rotation and the bolt 44 intermittently effects step indexing movements thereof.

This indexing cup 50 is referred to herein as a "stepping wheel." As shown, the rim of the wheel is slotted from the top, forming a castellated cup having sockets 52 therein defining the openings 51, but the cup shape and the form and position of the openings or other spaced bolt-engaging surfaces may be varied, as will be understood by those skilled in the art from this specification as hereinafter set forth.

If the indexing movement is started with the elements of the mechanism in the positions shown by the full lines in FIGURE 4 and if the eccentric 36 is rotated in a clockwise direction, then the initial portion of the rotation produces very little radial movement of bolts 40 and 44 but produces a circumferential swing of the arm 48 toward the position shown by the dash and dotted lines. As the arm 48 nears a position of alignment with the next selected opening 51', its swing is decelerated and the radial movement of the drive bolt 44 becomes more rapid, so that the bolt 44 is pushed into the opening 51' when they are lined up, and very soon thereafter the other bolt 40 is withdrawn from engagement with the stepping wheel. As a result, the stepping wheel is now free to be rotated. Then the circumferential swing of the cam follower 38 and of the arm 48 in a clockwise direction is accelerated. With the swing arm 48 locked to the stepping wheel 50 by the drive bolt 44, the arm 48 drives the wheel 50 and through it turns the column shaft 16 and the rotor 13.

As the end of this clockwise swing is approached, the swinging movement of follower 38 with its stud 42 is again decelerated so that it now is moving mostly in direction generally longitudinal to the bolts 40 and 44, whereby the locking bolt 40 is pushed out to the point at which it just begins to enter its next selected opening 51", and the drive bolt 44 is withdrawn from engagement with the stepping wheel. With continued rotation of eccentric 38, bolt 40 is fully engaged while the bolt 44 is further retracted and then moved laterally to engage the rotor for a second step.

It is to be noted that the stepping wheel 50 as shown in FIGURE 4 has an odd number of bolt-engaging openings 51, namely seven. As will be explained in greater detail further below, with the indexing drive mechanism as shown in FIGURE 4, an odd number of bolt-engaging openings are used when it is desired to stop the rotor 13 in an odd number of angularly spaced positions. For example, the stepping wheel and indexing drive mechanism as shown stops the rotor 13 in seven angular positions, each position corresponding to one of the bolt-engaging openings 51. Thus, in the embodiment of FIGURES 4 and 5 the locking bolt 40 and the drive bolt 44 both come into engagement in sequence with all of the openings 51.

When it is desired to stop the rotor 13 in an even number of angular positions, then, with this indexing drive mechanism, twice as many bolt-engaging openings 51 are provided. Thus, for example, twelve bolt-engaging openings 51 are provided for stopping the rotor 13 in six positions, and sixteen openings 51 are provided for stopping the rotor in eight positions, and so forth. As shown in FIGURE 6, the modified stepping wheel 50a is provided with sixteen bolt-engaging openings 51. In operation the arm 48a swings freely past the particular opening which is directly opposite to the opening being engaged by the locking bolt 40a. Thus, 51' indicates the opening previously engaged by the drive bolt 44a, and 51" indicates the next selected openings which is now being engaged by the drive bolt 44a, and 51''' indicates the next selected opening thereafter. Thus. in the embodiment of FIGURE 6, the drive bolt 44a engages in sequence with every other opening 51', 51", 51''' etc., and the locking bolt 40a in sequence engages the respective intervening openings.

If an even number of steps is required in a full revolution, it is appropriate to use different types of openings for the locking bolt and for the drive bolt, respectively. This may be done, as illustrated by the openings 51c in FIGURES 8 and 9 by using mutually exclusive shapes, e.g., a wide rectangular slot for one and a circular hole for the other of diameter less than the wide dimension of the first and greater than the lesser dimension of the first, so that neither bolt can go into the hole for the other; or the holes for one may be at a different level from those for the other, and the respective bolts be positioned at the levels of their holes.

These are only a few variations to illustrate the many feasible variations which will occur to those skilled in the art. It is found to be preferable to have the ends of the bolts tapered slightly as this facilitates smooth entry into the openings in the stepping wheel.

It will be observed that, with this driving mechanism, the engagement is very rapid, as it occurs where the motion of the eccentric is mostly in the radial direction. The load is accelerated gradually after eacsh engagement and is again gradually decelerated, due to the sinusoidal motion of the eccentric. This is highly desirable as it avoids any excessive loading on the electric motor 28, and it avoids hammering and undue vibration of the parts of the mechanism; and consequently avoids inertial displacement of parts being carried, and it gives more time at each stopped position with quickest possible indexing with smooth acceleration and deceleration.

It will also be observed that this structure permits of variation of the mechanical advantage as between the electric motor 28 and the load, as this is determined by the throw of the cam 36 (the eccentricity in the example shown), and by the radial positions of the studs 39 and 42. By appropriate design of these, the amplitude of the arc of travel for each swing can be increased or decreased. If high torque is required larger stepping wheels, eccentrics and bolts can be employed, whereas if relatively low torque is sufficient, economy of material is possible by using relatively smaller elements.

By changing stepping wheels, substituting wheels with a different number of bolt-engaging openings, and changing cam and follower to a set with a different throw corresponding to the arcuate steps for the new wheel, this device can be quickly adapted to any desired stopping position, and will assure precision positioning at each stop.

By inserting springs, or other resiliently compressible means, into the swing arm drive or in the driving and locking bolts, this mechanism enables the user to vary the spacing between the bolt-engaging openings, and therefore the successive arcs of the stepping movements. This is illustrated for example, by the modification shown in FIGURE 7, in which case the driving bolt 44b is modified by having spring means 54 to permit its longitudinal compression. Thus if bolt 44b does not at first find an opening 51 at the position where it is moved out against the flange 57, the resilient means 54 will yield and allow the cam follower 38 to have its normal outward movement and thereby to retract the locking bolt 40 (not shown in FIGURE 7) even though the driving bolt 44b cannot enter its slot. As the follower 38 proceeds in its swinging movement, it will move bolt 44b laterally along the inside of the rim 57. When the bolt 44b finds its next selected slot, the spring means 54 will push it home and thereupon the wheel 50 is locked to the follower 38 and is moved thereby in its driving step.

It is also possible with this invention utilizing a driving bolt 44b with resilient means 54 to stop at different positions on successive rotations of the rotor 13 if the stepping arcs do not add up to 360°. In such case the mechanism operates as described above on the first cycle, but the second time around the bolts do not line up with the same set of openings, but with intermediate ones. Thus, for example, if each step is 48° there will be seven full steps in a full rotation plus a 24° residue. Hence, on the next full rotation the bolts will be lined up half way between the openings 51 used on the first cycle. If the openings on the stepping wheel 50 are 24° from center the center, that is, if fifteen openings 51 are used the rotor 13 will stop at alternate stations on the first cycle and at the intermediate stations on the next cycle.

The apparatus as thus far described above produces rapid transfer, or indexing, from station to station, the dwell time at each station depending upon the geometry of the eccentric and the speed of rotation of the motor. In some instances it will be desirable to have a longer dwell time between indexing steps for carrying on the parts-treating operations at the several stations. This can be accomplished by using a slower speed motor or a suitable gear reduction, but this, of course, would also increase the transfer time between stations. Control mechanism is shown as being provided for increasing the dwell time at will without slowing down the transfer time. This control is obtained by means of a switch device 55 (see FIG. 5) having an operating arm 56, provided at its end with a roller and an adjustable abutment screw 58 secured on the locking bolt 40.

The switch device 55 is a timing switch, i.e., when the arm 56 is moved by the locking bolt, the current to the electric motor 28 is shut off for a predetermined time, after which it automatically is re-energized. Thus when the stepping wheel 50 has been moved so as to bring the rotor 13 into successive desired positions, and the locking bolt 40 has been driven into the locking position shown in FIGURES 4 and 5, and when the abutment 58 has struck the roller on the arm 56 and swung the arm to the left, which has operated the time delay switch 55, the motor 28 is shut off for a period sufficient to increase the dwell time of the rotor 13 as required for the various operations. After the predetermined interval the motor circuit is again closed by automatic operation of switch 55; the motor again operates the eccentric 36 and in due course indexes the device to the next stations as described previously.

It is an important advantage of this invention that the starting torque of the load is low due to the mechanical advantage of the eccentric which only gradually begins to move in a driving direction after the driving bolt has been engaged. Thus, it is feasible to shut off the electric motor 28 so as to increase the dwell time without excessively increasing the current load upon the restarting of the motor.

In FIGURES 4, 5 and 6, the respective sets of guide rails 46 and 47, 46a and 47a are arranged symmetrically, that is, the mid-position of the cam follower 38 or 38a and the mid-position of the swing arm 48 or 48a places the locking bolt 40 or 40a and the driving bolt 44 or 44a both on the same diameter passing through the axis of the stepping wheel and through the axis of the eccentric shaft 32 or 32a. In certain applications, for example, for providing a large number of small stepping movements during a complete rotation or sequence of rotations of the stepping wheel, then a non-symmetrical arrangement of these driving and locking elements provides advantages. For example, as illustrated in FIGURE 10, the stepping wheel 50d includes nineteen bolt-engaging openings 51. The shaft 32d is offset from the center $C_1$ of the stepping wheel and is supported in bearings mounted on the frame 20. The stud pin bearing 42d is offset from a straight line passing through the axis of the stud pin bearing 39d and the center $C_2$ of the eccentric 36d. The pairs of guides 46d and 47d for the locking bolt 40d and for the driving bolt 44d, respectively, are directed along lines which are non-radial with respect to the center $C_2$. Spring means 54d are included for urging the driving bolt outwardly at all times, similar to the spring means 54 in FIGURE 7. With this asymmetrical arrangement of the elements, the stepping wheel 50d is moved stepwise by an amount equal to twice the arcuate spacing between adjacent openings 51, i.e. $\frac{2}{19}$ of a complete rotation of the stepping wheel during each rotation of the shaft 32d. Thus, this mechanism of FIGURE 10 provides a 37.9° indexing movement of the stepping wheel; so that the stepping wheel turns through two complete rotations before it again is stopped at its initial position.

To provide the longer stepping arcs such as described in connection with FIGURES 4, 5 and 6, it is preferred to utilize the symmetrical arrangement described with reference to those figures, because this symmetrical arrangement provides symmetrical curves of acceleration and deceleration of the stepping wheel.

As used herein, the term "opposite side" of the stepping wheel and similar phrases mean generally on the opposite sides of a diameter thereof. For example, the locking and driving bolts 40d and 44d in FIGURE 10 engage in respective openings on "opposite sides" of the stepping wheel.

This electric motor driven indexing mechanism embodying the present invention is advantageous for use regardless of the orientation of the axis of rotation of the parts-holding rotor being turned thereby. Thus, for example, this indexing mechanism is well suited for use in a parts washer where the fabricated parts are moved into a cage rotatable about an axis parallel to the direction of ingress and egress or in a turn-over device rotating on a transverse axis, as well as in a merry-go-round type of indexing rotor carrier as shown in the accompanying drawings.

We claim:

1. A power washer apparatus for the surface treatment of fabricated parts wherein liquid is impinged upon the fabricated parts at successive stations and the parts are indexed from station to station and are held in said stations for predetermined periods, an indexing mechanism for driving a carriage step-by-step and accurately positioning it at a succession of stations during successive operations, which comprises a driven member connected to said carriage and having on opposite sides thereof spaced openings, a fixed frame on which said driven member is mounted for movement with said carriage, a locking bolt adapted to fit into the openings on one side of said driven member, a driving bolt adapted to fit the openings on the other side of said driven member, means on said frame slidably confining said locking bolt to a fixed path toward and away from an adjacent one of said openings when brought to the adjacent position, eccentric drive means rotatably mounted on said frame, reciprocating means movably mounted on said frame and driven by said eccentric drive means, said reciprocating means being constrained for reciprocating movement paralleling that of said driven member and having thereon means for slidably engaging the driving bolt and constraining its movement relative thereto to a path toward and away from an adjacent one of said openings, whereby said reciprocating means is locked to said driven member by engagement of said driving bolt in one of said openings and drives said member a predetermined step and is withdrawn from said opening to disconnect from the driven member for return to its engaging position for the next selected opening, a motor connected in driving relation to said eccentric drive means and said reciprocating-means also being connected to said locking bolt to push it into its opening when the driving bolt is withdrawn and to retract it from its opening before driving said driven member, and electrical timing switch means responsive to said locking bolt means when the locking bolt is inserted into its opening for temporarily stopping the movement of said eccentric drive means, thereby temporarily holding said parts at said stations, said eccentric drive means and said reciprocating means providing smooth acceleration of said driven member following restarting of said eccentric drive means and providing smooth deceleration of said driven member prior to stopping of said eccentric drive means.

2. In apparatus for the impingement of liquid upon fabricated parts for the surface treatment thereof, an indexing mechanism for driving a carriage step-by-step and accurately positioning it at a succession of stations for successive operations comprising a driven member connected to said carriage and having at opposite sides bolt-engaging openings for controlling the movement of said carriage, a fixed frame, a rotatable cam mounted in said frame, a cam follower adapted to apply a driving force from said cam for moving said carriage from one station to the next and, before and after said driving respectively, to apply forces directed toward and away from said bolt-engaging openings, motor means for driving said cam, coupling bolts connected to said cam follower respectively adjacent said openings on opposite sides of said driven member adapted to engage alternately with said openings, respectively, a first of said coupling bolts being engaged also with anchoring means for accurately positioning and holding said carriage during an operation at one station, and a second coupling bolt during alternate periods being engaged with the driven member, and through it with said carriage, and a swinging arm on which the second coupling bolt is mounted and having means thereon constraining the movement of said second coupling bolt to a predetermined path outward and back on said arm for engagement in and release from a sequence of said openings, said arm being pivoted to said frame, whereby said cam engages the second coupling bolt into one of said openings and retracts the first coupling bolt to free said driven member for stepping movement, and then drives said swinging arm laterally, and through it, said driven member by virtue of said second coupling bolt engaged therebetween, and thereafter propels the first coupling bolt into an opening to hold the driven member and carriage in position for the next liquid impingement operation, timing switch means responsive to each engagement of said first coupling bolt with said driven member for temporarily stopping the movement of said cam for holding the carriage positioned at the stations, and said cam upon resumption of its movement retracts the second bolt to free the second bolt, and continuing movement of said cam to complete its cycle drives the disengaged swing arm back to a position for engaging the second bolt in the next selected opening for repeating the cycle.

3. In apparatus for impinging liquid upon fabricated parts for washing, cleaning, deburring and the like, an indexing mechanism for driving a rotating carriage step-by-step and accurately positioning it at a succession of stations for successive liquid impingement operations comprising a stepping wheel coupled to said carriage in driving relation thereto and having a ring of spaced faces, a frame on which said stepping wheel is rotatably mounted, a cam, a motor connected to said cam for rotating it, cam follower means positioned to be moved by said cam in directions longitudinal of the travel of said stepping wheel and, before and after such movements, to be moved in directions respectively toward and away from said ring of faces on the stepping wheel, a locking bolt pivotally connected to said cam follower means, slidably mounted on said frame, directed toward one side of said ring of faces and adapted to engage one of said faces for locking the wheel to said frame and thereby accurately positioning it during said operations, guide means secured to said frame and adapted to constrain said bolt to longitudinal movement into and back from said engagement, a swinging arm pivotally mounted on the frame, a driving bolt slidably mounted on said swinging arm and pivotally connected to said cam follower for reciprocating movement out and back along said arm toward and away from the opposite side of said ring of faces, whereby movement of said follower means toward said ring will drive said bolt into engagement with a face of said ring, movement of the follower means longitudinal of the direction of travel of said wheel will swing said arm and drive the wheel by virtue of the bolt engaging a face in said ring, movement of the follower means away from the stepping wheel will disengage said bolt, and movement opposite to that of the driving step will return the bolt to the initial position for engaging another face, and meanwhile movement of the follower means drives said locking bolt into engagement with a face of said ring as the driving bolt is disengaged and thereby holds the wheel positioned for one of said operations while said swinging arm is being returned for engagement with another driving face, and then retracts said locking bolt to free the wheel for rotation by movement of the swinging arm while its driving bolt is engaged with a face in said ring.

4. In apparatus for impinging liquid upon fabricated parts for washing, cleaning, deburring and the like, an indexing mechanism as defined in claim 3 in which the cam follower extends around the cam and has its pivotal connection to the locking bolt on one side of the cam and its pivotal connection for the driving bolt on the opposite side thereof.

5. A device as defined in claim 3 in which the carriage is rotatably mounted on a vertical axis, and the cam is a circular eccentric rotating on the said axis of the stepping wheel.

6. In apparatus for impinging liquid upon fabricated parts, an indexing mechanism for driving a carriage step-by-step and for holding the carriage at an even number of angularly spaced positions comprising a stepping wheel having a ring of openings spaced an angular distance which when divided into a full circle gives an even number of twice the number of said positions, and a driving means adapted to engage in alternate openings at one side of the wheel and intermittently to drive said wheel by swinging in an arc equal to twice said spacing, a locking means at the opposite side of the wheel adapted to engage in the intervening openings between those which have been engaged by said driving means for positioning said wheel accurately for the intervening periods, motor mechanism, a rotatable cam driven by said motor mechanism, a cam follower driven by said cam and being coupled to said driving means and to said locking means for operating them, first guide means for guiding said locking means into and out of said intervening openings and for anchoring said locking means against movement when engaged with one of said intervening openings, said driving means including a swingable arm, a driving bolt slidably mounted on said arm, and second guide means on said arm for guiding said driving bolt into and out of said alternate openings.

7. In apparatus for impinging liquid upon fabricated parts, an indexing mechanism as defined in claim 6 wherein the stepping wheel is engaged at all times by one or both of the driving and locking means which are positioned and dimensioned respectively to be released from engagement only when the other is engaged.

8. In apparatus for impinging liquid upon fabricated parts, an indexing mechanism for driving a parts-holding carriage step-by-step comprising a stepping wheel having a first and a second series of openings, the respective openings of said two series alternating in position around said wheel, the openings of each series being spaced apart by the angular distance of said steps, driving means adapted and positioned to engage the first and not the second of said series of openings and locking means adapted to engage the second series for holding said carriage stationary when said driving means is disengaged, said driving means including a driving bolt adapted to engage successively in the first series of openings, and guide means for guiding said driving bolt into and out of said first series of openings, a cam follower coupled to said driving bolt, an eccentric cam for operating said cam follower, and a motor mechanism for turning said eccentric cam, said locking means including a locking bolt coupled to said cam follower and adapted to engage successively in the second series of openings, and anchoring means for anchoring said locking bolt when engaged in the other series of openings.

9. In apparatus for impinging liquid upon fabricated parts for surface treatment thereof, an indexing mechanism for driving a parts-holding carriage step-by-step comprising a stepping wheel having a first and a second series of openings, the respective openings of said two series alternating in position one with another in sequence around said wheel, the openings of each series being spaced apart by the angular distance of said steps, said two series being of mutually exclusive shapes, respectively, driving means adapted and positioned to engage in the openings of the first series but to pass over those of the second series, and holding means adapted to engage in the openings of the second series and pass over those of the first series, said driving means including a movable driving element for successively engaging the first series of openings, a swingable arm, first guide means on said arm for guiding said driving element into and out of said first series of openings, motor mechanism, a cam driven by said cam, said cam follower being coupled to said driving element, said locking means including a locking element for engaging successively the second series of openings, and second stationary guide means for guiding said locking element into and out of said second series of openings, said cam follower being coupled to said locking element.

10. In apparatus for impinging liquid upon fabricated parts for surface treatment of the parts, an indexing mechanism for driving a carriage step-by-step comprising a stepping wheel having a rim with a ring of openings spaced apart, driving means having a swingable arm, a first bolt slidably mounted on said arm and adapted to engage in said openings successively to drive said wheel step-by-step and holding means including a second bolt adapted to engage in said openings successively between driving steps and thus to position said wheel accurately for the intervening periods, said driving means including an eccentric cam, a motor mechanism for operating said cam, a cam follower driven by said cam and pivotally connected to said second bolt, said cam follower being pivotally and slidably coupled to said first bolt, spring means acting between said cam follower and said first bolt for urging said first bolt toward said rim, and said first and second bolts being positioned on opposite sides of said cam and actuated in sequence thereby.

11. In power washing apparatus for impinging upon fabricated parts a liquid such as washing liquid, cleaning liquid, or an abrasive-liquid mixture, or the like, a carriage rotatably mounted on said frame for rotation about an axis, a plurality of parts-holding fixtures on said carriage spaced about said axis, a stepping wheel connected to said carriage for controlling the rotation thereof and having a plurality of bolt-engaging surfaces at points spaced about the center thereof, an electric motor, a speed reducer driven by said motor, a rotary drive shaft mounted on said frame and being driven by said speed reducer, a crank on said drive shaft, an indexing member engaging said crank for movement thereby, a locking bolt pivotally connected to said indexing member, first guide means fixed on the frame for guiding the movement of said locking bolt toward and away from respective bolt-engaging surfaces, a driving bolt pivotally connected to said indexing member on the opposite side thereof from said locking bolt, a swing arm pivotally mounted on the frame, and second guide means mounted on the arm for guiding said driving bolt toward and away from respective bolt-engaging surfaces.

12. In power washing apparatus as claimed in claim 11 for impinging upon fabricated parts, a liquid such as washing liquid, cleaning liquid, or an abrasive-liquid mixture, or the like, parts-handling apparatus wherein said crank on said drive shaft is an eccentric engaging the center portion of said indexing member.

13. In power washing apparatus as claimed in claim 11 for impinging upon fabricated parts a liquid such as washing liquid, cleaning liquid, or an abrasive-liquid mixture, or the like, parts-handling apparatus wherein the axis of said drive shaft is offset from the axis of rotation of said carriage.

14. In power washing apparatus as claimed in claim 11 for impinging upon fabricated parts a liquid such as washing liquid, cleaning liquid, or an abrasive-liquid mixture, or the like, parts-handling apparatus wherein said second guide means are mounted near the outer end of said swingable arm, the inner end of said swingable arm being pivotally mounted near the center of said stepping wheel, said driving bolt being pivotally and slidably connected to said indexing member, and spring means for urging said driving bolt toward the bolt-engaging surfaces of the stepping wheel.

15. Apparatus as claimed in claim 14 wherein the inner end of said swingable arm is pivotally mounted on said drive shaft.

16. In power washing apparatus as claimed in claim 11, parts-handling apparatus wherein said carriage includes a main shaft at the axis of rotation of said carriage, said drive shaft of the indexing mechanism being aligned with said axis of rotation and rotatably mounted at one end of the main shaft of the carriage.

17. In apparatus for the impingement of liquid upon fabricated parts for the surface treatment thereof, an indexing mechanism for driving a carriage step-by-step and accurately positioning it at a succession of stations for successive operations comprising a driven member connected to said carriage and having at opposite sides bolt-engaging openings for controlling the movement of said carriage, a fixed frame, a rotatable cam mounted in said frame, a cam follower adapted to apply a driving force from said cam for moving said carriage from one station to the next and, before and after said driving respectively, to apply forces directed toward and away from said bolt-engaging openings, motor means for driving said cam, coupling bolts connected to said cam follower respectively adjacent said openings on opposite sides of said driven member adapted to engage alternately with said openings, respectively, a first of said coupling bolts being engaged also with anchoring means for accurately positioning and holding said carriage during an operation at one station, and a second coupling bolt during alternate periods being engaged with the driven member, and through it with said carriage, and a swinging arm on which the second coupling bolt is mounted and having means thereon constraining the movement of said second coupling bolt to a predetermined path outward and back on said arm for engagement in and release from a sequence of said openings, said arm being pivoted to said frame, said second coupling bolt being pivotally and slidably coupled to said cam follower, and a spring engaged between said cam follower and said second coupling bolt for forcing said second coupling bolt toward said bolt-engaging openings, whereby said cam and spring engages the second coupling bolt into one of said openings and retracts the first coupling bolt to free said driven member for stepping movement, and then drives said swinging arm laterally, and through it, said driven member by virtue of said coupling bolt engaged therebetween, and thereafter propels the first coupling bolt into an opening to hold the driven member and carriage in position for the next liquid impingement operation, and retracts the second bolt to free the second bolt, and continuing movement of said cam to complete its cycle drives the disengaged swing arm back to a position for engaging the second bolt in the next selected opening for repeating the cycle.

References Cited in the file of this patent

UNITED STATES PATENTS

| | | |
|---|---|---|
| 728,457 | Hanson | May 19, 1903 |
| 2,443,091 | Zademach | June 8, 1948 |
| 2,486,128 | Davis | Oct. 25, 1949 |